United States Patent Office 3,451,457
Patented June 24, 1969

3,451,457
SAFETY RING FOR TIRE-CARRYING WHEELS
Gunter Leyer, Wuppertal-Wohwinkel, Germany, assignor to Kronprinz Aktiengesellschaft, Solingen-Ohligs, Germany
Filed July 17, 1967, Ser. No. 653,972
Claims priority, application Germany, July 15, 1966, K 59,768
Int. Cl. B60c 17/04
U.S. Cl. 152—158          1 Claim

ABSTRACT OF THE DISCLOSURE

A safety or emergency ring for installation in the rims of tire-carrying wheels. The ring consists of several sections fastened to the rim and supported by the same. A spring inserted between ring and rim urges the tire against the rim and holds it firmly in place. In the event of pressure loss, the tire rides on the safety ring without shifting and is not damaged. The device is applicable to tubeless tires.

---

Figure 1:
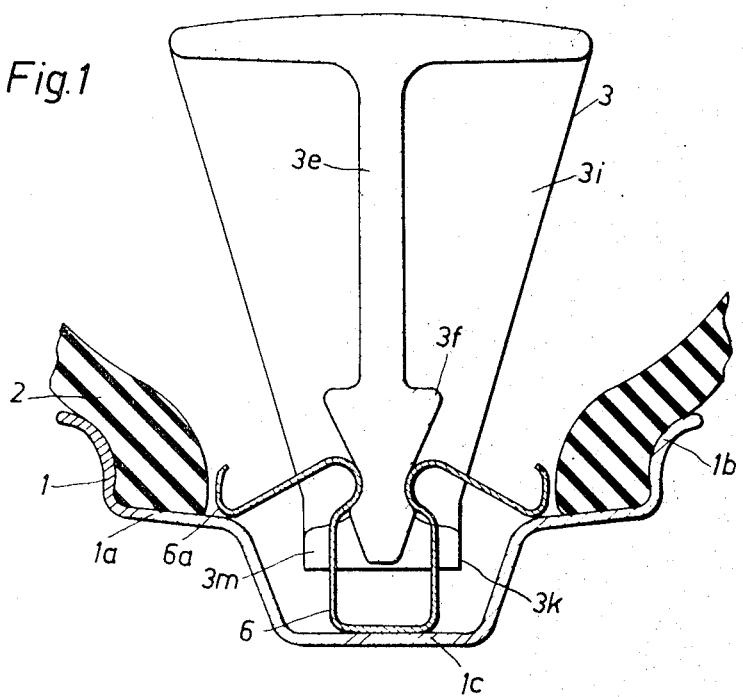

It had previously been proposed to install emergency or safety rings within the air space enclosed by the tire. These rings are rigidly fastened to the rim of the wheel. When the air pressure of the tire sinks below a given minimum, the tire is supported by the internal safety ring without coming loose from the wheel. However, it has been found that such wheels, provided with this kind of emergency ring, are expensive and that the tires are difficult to mount. Moreover, tires have been found to shift or "wander" on the rim when resting on the ring.

It is the object of the invention to devise an emergency or safety ring which has no such drawbacks. The wheel assembly according to the invention is applicable to tubeless tires.

According to the invention, the wheel has an undivided well base rim carrying a hollow annular body. This body or ring is divided into three or more sections whose frontal areas abut upon each other in a formlocking manner. These sections are supported by the rim and the lower walls, facing the rim base, are fastened thereto by bolts. The foot or base part of these sections is provided with springs which press the tire bead against the wheel flanges. The springs are of angular shape, the crown facing the rim.

According to the invention, the emergency or safety ring has a double-T cross section; the narrower bottom flange has recesses and the cross piece is provided with wedge-shaped reinforcements. The cross piece advantageously has two superimposed wedge-shaped reinforcements at the points where the springs are attached, the reinforcement nearer the foot part being weaker than the other.

A considerable advantage of the invention resides in the fact that the spring, prior to installation, can be clamped in these reinforcements. The shape of the spring effects a secure seat of the bent ends on the biased shoulder of the rim, as soon as the section is fastened.

The invention now will be further explained with reference to the accompanying drawings. However, it should be understood that these are given merely by way of illustration, and not of limitation, and that it is intended to cover all modifications and variations which do not depart from the spirit and the scope of the invention as herein after claimed.

Figure 2:
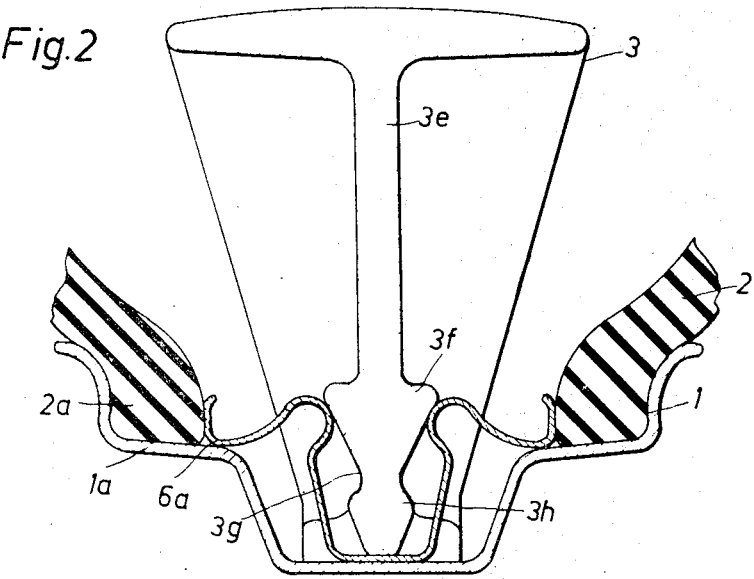
Figure 3:
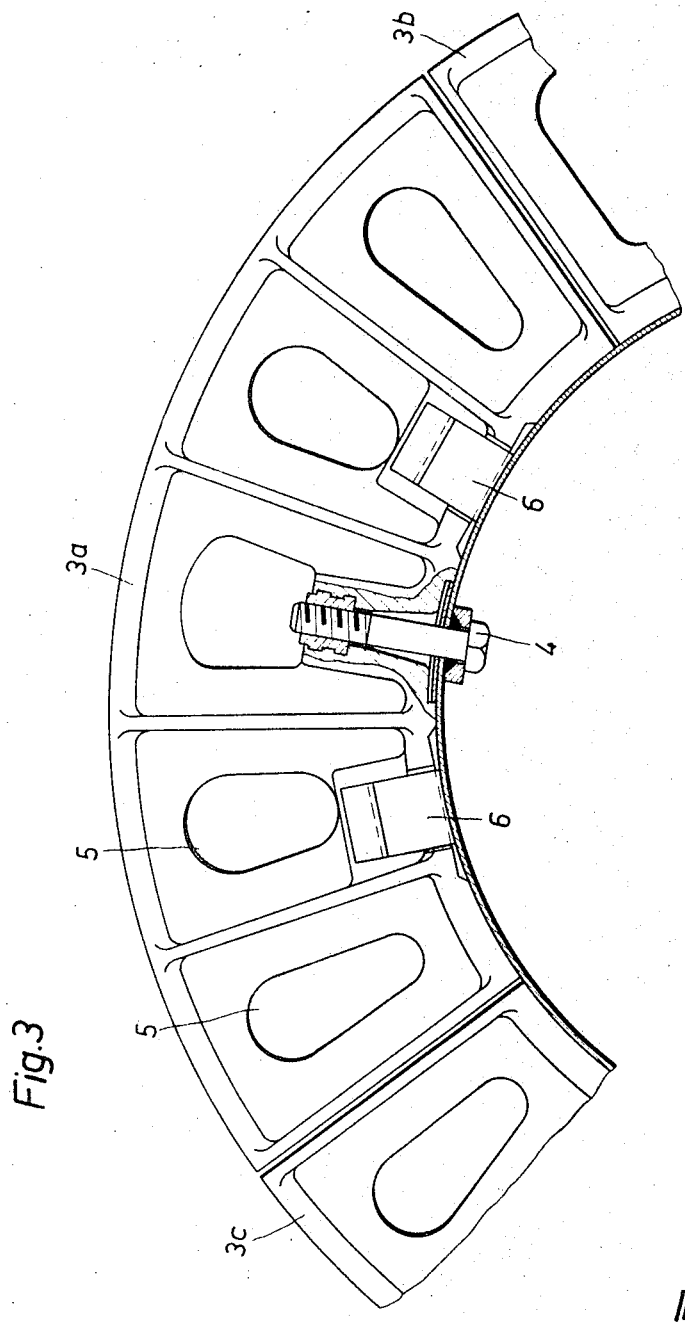

In the drawings,

FIG. 1 is an elevation of a wheel rim with emergency ring and spring, in section, shown before mounting;
FIG. 2 is a similar view as FIG. 1, showing the ring in mounted position; and
FIG. 3 is a side view of a portion of the emergency ring.

Referring now to these drawings, the emergency or safety ring 3 is disposed on the well base rim 1. Ring 3 consists of ring sections 3a, 3b, 3c, etc. (three such sections being shown in FIG. 3, but more can be used if desired). These sections are fastened to the rim bottom 1c, e.g., by means of head bolts 4. Each ring section may have apertures 5 to facilitate circulation of air. The bottom flange 3k has recesses 3m in at least two places of each ring section. The cross piece 3e is reinforced at those points by a wedge 3f. Springs 6, prior to installation of the ring sections in the tire 2, are clamped in the recesses 3m, resting in one depression 3g on each side of cross piece 3e. This depression 3g can be formed in such a manner that within cross piece 3e two superimposed wedge-shaped reinforcements 3f, 3h are provided, 3h, closer to bottom flange 3k, being weaker than 3f.

Springs 6 are made from sheet steel and are shaped symmetrically in such a manner that shanks 6a rest on the inclined or biased shoulders 1a of rim 1 upon fastening of a ring section 3. When head bolt 4 is tightened, the bent ends of shank 6a slide on the shoulders 1a, from the start of the fastening of a section 3, and urge the tire bead 2a against wheel flanges 1b. Variations of the tire beads from the well base rims thereby are compensated, so that the pressing force of springs 6 against the tire bead aways is so strong that "wandering" of the tire on the rim is prevented when the pressure is low.

I claim as my invention:

1. In a tubeless tire-carrying wheel having an undivided well base rim, a safety ring of double-T shape inserted in the air space between tire and rim comprising at least three ring sections; fastening means for said sections to the bottom of said rim; said ring having a bottom flange engaging in said rim bottom and a connecting cross piece provided with recesses; spring means inserted in said recesses, contacting and urging the bead of said tire against the sides of said rim; said tire, upon loss of pressure, riding on said safety ring without shifting on the rim and without incurring damage, said spring means being symmetrical steel bands assigned to each section, having a flat bottom portion, resting at the bottom of said rim when mounted, and a bent shank on each side, its end contacting said tire bead; said cross piece having two superimposed wedge-shaped enlargements near its lower end, the upper enlargement being of greater cross section than the lower one; said springs, prior to mounting of the ring, engaging in the depression formed by said two enlargements and, upon mounting, being pressed apart thus urging the tire beads against the sides of said rim.

References Cited

UNITED STATES PATENTS 2,989,108   6/1961   Gore _____ 152—158
3,025,898   3/1962   Opel _____ 152—158

FOREIGN PATENTS 1,470,895   1/1967   France.
1,176,013   8/1964   Germany.

ARTHUR L. LA POINT, *Primary Examiner.*
C. B. LYON, *Assistant Examiner.*